US008325008B2

(12) United States Patent
Keller, Jr. et al.

(10) Patent No.: US 8,325,008 B2
(45) Date of Patent: Dec. 4, 2012

(54) SIMPLIFIED METHOD AND APPARATUS FOR PROGRAMMING A UNIVERSAL TRANSMITTER

(75) Inventors: Robert Roy Keller, Jr., Park Ridge, IL (US); Joseph John Cacciatore, Woodridge, IL (US); Mark A. McCarthy, Jr., Schaumburg, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 2428 days.

(21) Appl. No.: 09/842,346

(22) Filed: Apr. 25, 2001

(65) Prior Publication Data
US 2004/0207537 A1 Oct. 21, 2004

(51) Int. Cl.
G05B 19/00 (2006.01)
(52) U.S. Cl. ...................................................... 340/5.64
(58) Field of Classification Search ............. 340/825.72, 340/825.69, 5.64, 5.23, 5.71, 176, 12.23, 340/5.2; 341/176
See application file for complete search history.

(56) References Cited

U.S. PATENT DOCUMENTS

| 3,906,348 | A | 9/1975 | Willmott .......................... 325/37 |
| 3,911,397 | A | 10/1975 | Freeny, Jr. ..................... 340/5.25 |
| 4,081,747 | A | 3/1978 | Meyerle ........................... 455/68 |
| 4,103,238 | A | 7/1978 | Deming et al. |
| 4,130,738 | A | 12/1978 | Sandstedt ..................... 359/147 |
| 4,263,536 | A | 4/1981 | Lee et al. ....................... 318/266 |
| 4,322,855 | A | 3/1982 | Mogi et al. ..................... 455/151 |
| 4,328,540 | A | 5/1982 | Matsuoka et al. ............. 700/56 |
| 4,422,071 | A | 12/1983 | de Graaf ................... 340/825.44 |
| 4,529,980 | A | 7/1985 | Liotine et al. ............ 340/825.52 |
| 4,535,333 | A | 8/1985 | Twardowski ............ 340/825.69 |
| 4,581,606 | A | 4/1986 | Mallory ......................... 340/539 |
| 4,596,985 | A | 6/1986 | Bongard et al. ......... 340/826.69 |
| 4,623,887 | A | 11/1986 | Welles, II ................. 340/825.57 |
| 4,626,848 | A | 12/1986 | Ehlers ....................... 340/825.69 |
| 4,652,860 | A | 3/1987 | Weishaupt et al. ........... 340/539 |
| 4,750,118 | A | * | 6/1988 | Heitschel et al. ............. 360/400 |

(Continued)

FOREIGN PATENT DOCUMENTS
WO WO 94/02920 2/1994

OTHER PUBLICATIONS

International Search Report for PCT/US02/12804 completed Oct. 2, 2002.

(Continued)

Primary Examiner — Vernal Brown
(74) Attorney, Agent, or Firm — Fitch Even Tabin & Flannery LLP

(57) ABSTRACT

A universal transmitter capable of transmitting a plurality of signals at a plurality of different modulations and frequencies which provides a simplified programming setup so that multiple signal configurations (including code format, modulation format and frequency) can be programmed quickly and easily. The transmitter comprises a signal configuration input which an operator can use to select a desired signal configuration for transmission, a controller for interpreting the selected signal configuration, storing it to memory, retrieving it when the appropriate user input is depressed, and outputting it to a transmitter circuit capable of transmitting the selected signal configuration received from the controller at a predetermined modulation and frequency, and at least one user input for actuating the transmitter and identifying to the controller what signal configuration is to be transmitted by the transmitter.

20 Claims, 6 Drawing Sheets

U.S. PATENT DOCUMENTS

| | | | | |
|---|---|---|---|---|
| 4,825,200 | A | 4/1989 | Evans et al. | 341/23 |
| 4,905,279 | A | 2/1990 | Nishio | 380/9 |
| 4,912,463 | A | 3/1990 | Li | 340/825.69 |
| 4,988,992 | A | 1/1991 | Heitschel et al. | 340/825.69 |
| 4,999,622 | A | 3/1991 | Amano et al. | 340/825.72 |
| 5,028,919 | A | 7/1991 | Hidaka | 340/825.72 |
| 5,054,114 | A | 10/1991 | Erickson | 455/78 |
| 5,081,534 | A | 1/1992 | Geiger et al. | 358/194.1 |
| 5,103,221 | A | 4/1992 | Memmola | |
| 5,142,398 | A | 8/1992 | Heep | 359/148 |
| 5,319,802 | A | 6/1994 | Camiade et al. | 455/85 |
| 5,379,453 | A | 1/1995 | Tigwell | 455/151.2 |
| 5,442,340 | A | 8/1995 | Dykema | 340/825.22 |
| 5,442,341 | A | 8/1995 | Lambropoulos | |
| 5,471,668 | A | 11/1995 | Soenen et al. | 455/352 |
| 5,475,366 | A | 12/1995 | Van Lente et al. | 340/525 |
| 5,479,155 | A | 12/1995 | Zeinstra et al. | 350/825.22 |
| 5,515,052 | A | 5/1996 | Darbee | |
| 5,552,641 | A * | 9/1996 | Fischer et al. | 307/10.5 |
| 5,563,600 | A | 10/1996 | Miyake | |
| 5,564,101 | A | 10/1996 | Eisfeld et al. | 455/352 |
| 5,568,122 | A | 10/1996 | Xydis | |
| 5,621,756 | A | 4/1997 | Bush et al. | 375/219 |
| 5,654,714 | A | 8/1997 | Takahashi et al. | |
| 5,661,804 | A | 8/1997 | Dykema et al. | 380/21 |
| 5,680,115 | A | 10/1997 | Sim | |
| 5,686,903 | A | 11/1997 | Duckworth et al. | 340/825.22 |
| 5,686,904 | A | 11/1997 | Bruwer | |
| 5,708,415 | A | 1/1998 | Van Lente et al. | |
| 5,764,697 | A | 6/1998 | Sakuma et al. | |
| 5,790,948 | A | 8/1998 | Eisfeld et al. | |
| 5,831,548 | A | 11/1998 | Fitzgibbon | |
| 5,841,390 | A | 11/1998 | Tsui | |
| 5,854,594 | A | 12/1998 | Lin et al. | |
| 5,872,562 | A | 2/1999 | McConnell et al. | |
| 5,896,113 | A | 4/1999 | O'Neil, Jr. | 343/895 |
| 6,005,508 | A | 12/1999 | Tsui | |
| 6,081,203 | A | 6/2000 | Fitzgibbon | 340/825.72 |
| 6,137,421 | A | 10/2000 | Dykema | |
| 6,154,544 | A | 11/2000 | Farris et al. | |
| 6,181,255 | B1 | 1/2001 | Crimmins et al. | |
| 6,249,673 | B1 * | 6/2001 | Tsui | 455/92 |
| 6,366,198 | B1 * | 4/2002 | Allen et al. | 340/426 |
| 6,486,795 | B1 | 11/2002 | Sobel et al. | |
| 6,556,813 | B2 * | 4/2003 | Tsui | 455/92 |

OTHER PUBLICATIONS

Eversafe Universal Garage Door Opener Transmitter; Operator's Manual;May 1996.

* cited by examiner

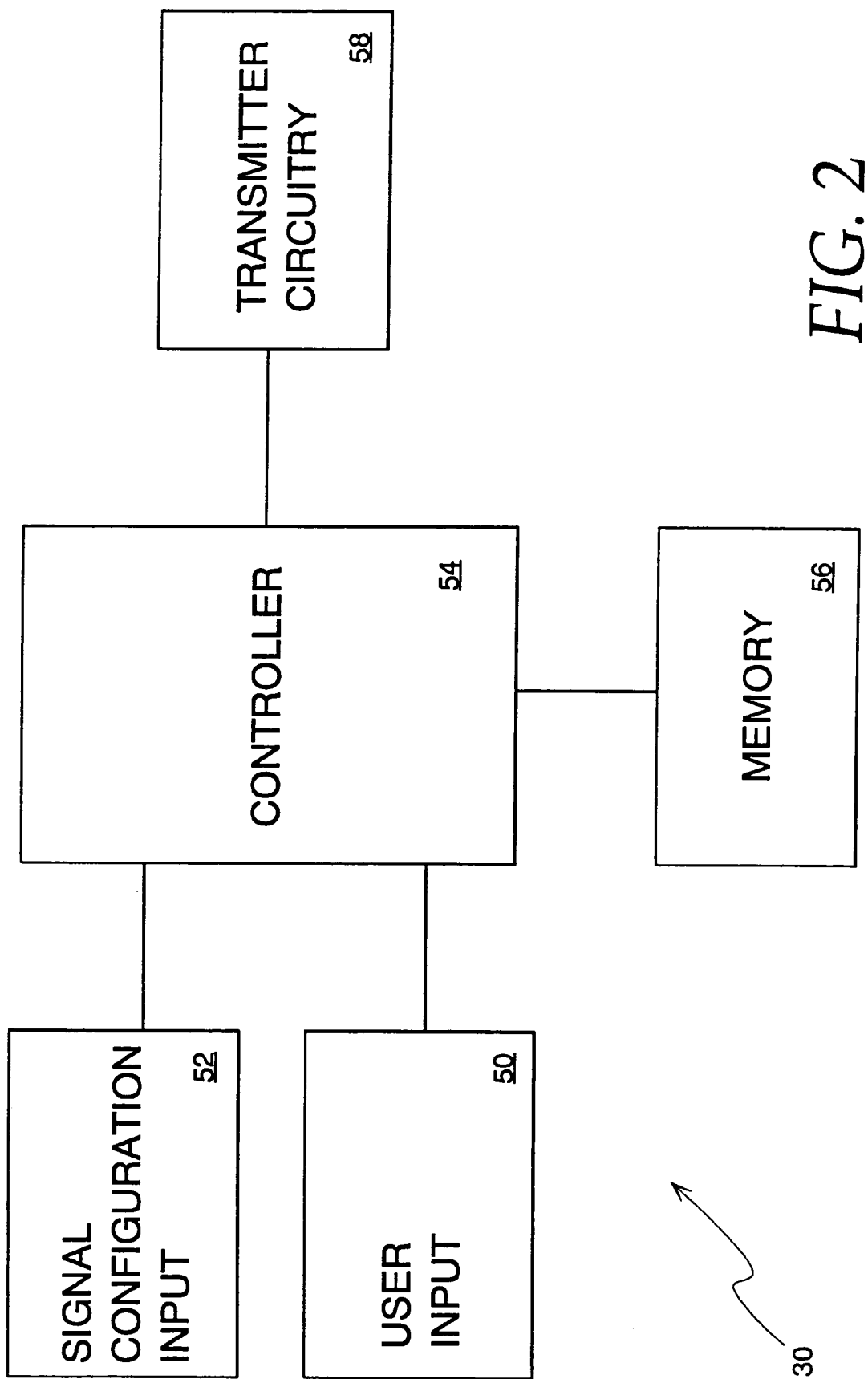

SIMPLIFIED METHOD AND APPARATUS FOR PROGRAMMING A UNIVERSAL TRANSMITTER

REFERENCE TO COMPUTER PROGRAM LISTING APPENDIX SUBMITTED ON COMPACT DISC

The computer program listing appendix contained within file "70550prgrm_lstng.txt" on compact disc "1 of 1", which has been filed with the United States Patent and Trademark Office in duplicate, is hereby incorporated herein by reference. This file was created on Apr. 25, 2001, and is 72 KB in size.

BACKGROUND OF THE INVENTION

This invention relates generally to transmitters and more particularly concerns a simplified method and apparatus for programming universal radio frequency (RF) transmitters.

Transmitters are used in a variety of applications in which wireless operation is desired. For example, most garage door openers, gate operators, and rolling shutter systems utilize transmitters to operate the movable barrier associated with the operator, (e.g., to operate the door, gate or shutter). Many of the transmitters supplied with these products are designed as single function, single frequency devices with a preset carrier frequency and use either a switch-selectable code or a preset factory code. Switch-selectable codes are set by the user setting a plurality of switches on the transmitter and the receiver units. Factory-set codes are input into the receiver by causing a controller (e.g., microcontroller or other processor such as a microprocessor, gate array or the like) within the receiver to perform a learn function. The receiver enters the learn mode, then the user activates the transmitter, which transmits a signal representing the factory programmed code stored in the transmitter.

Over the years, there have been a variety of code formats used for RF transmitters. Many of the commonly used code formats employ a fixed code format that may be set with Dual In-line Package switches (DIP switches), non-volatile memory devices, or the like. Other more secure formats include billion code format in which operators can be programmed to operate upon receipt of an authorized actuation signal which consists of a code that is selected from more than a billion possible codes. More recently, rolling code formats have become widely used in order to offer a greater degree of security.

Rolling code transmitters are preferred in such applications as remote keyless entry systems, garage door operators, etc. An example of a rolling code generating transmitter of the type described herein is disclosed in U.S. patent application Ser. No. 08/873,149 filed Jun. 11, 1997, now U.S. Pat. No. 6,154,544 issued Nov. 28, 2000, which is assigned to Applicants' assignee and is hereby incorporated herein by reference.

Fixed code RF transmitters are preferred in such applications as gate operators, which are typically operated by many more users than a garage door operator, because they are easy to program—making it easier to add/program additional transmitters to be used with the gate operator. For example, additional DIP (or fixed) coded RF transmitters can be programmed simply by matching the fixed command code, (e.g., the code identified by the various position of the DIP switches), of the added transmitter to other RF transmitters programmed for operating the gate. This eliminates the need to go through a lengthy programming sequence.

In addition to the various code formats used, several transmitter manufacturers have developed their own modulation format and have selected their own carrier frequencies for transmitting coded signals. For example, some garage door operator manufacturers transmit actuation signals consisting of packets of ten bit codes at 300 MHZ (Multi-Code), others transmit packets of eight bit or ten bit codes at 310 MHZ (Linear/Moore-O-Matic/Stanley), while still others transmit packets of nine bit, twelve bit, or twenty bit codes at 390 MHz (Genie/Chamberlain).

Unfortunately, transmitters often stop working, break, become damaged and/or get lost before their respective receivers die out. When this happens, it often becomes necessary to purchase a new transmitter. Most manufacturers who sell products using transmitters offer replacement transmitter units for sale for a period of time. However, as manufacturers improve their products by offering greater functionality, the cost of providing replacement parts for older model units increases and over time makes the manufacture of some transmitters impractical to do. In addition, the aftermarket for replacement transmitters is brisk, which leaves little incentive for a company to fill this gap and provide nothing but replacement transmitters. As a solution to these problems some companies offer universal transmitters for sale which can be used on a variety of products made by a variety of manufacturers.

In order to operate properly, universal transmitters must be capable of transmitting a plurality of different codes at a plurality of different code modulations and frequencies (or carrier frequencies). These transmitters are often sought after because consumers do not always know what type of transmitter they need, or prefer having the security of knowing that the transmitter they are buying will work with their system. Universal transmitters are also attractive to personnel who install and service movable barrier operators because they reduce the number of transmitters the installers need to stock and reduce the number of transmitters they need to learn how to program and/or operate.

In order to offer these capabilities, however, the electronic circuits used within the transmitter become more complex, larger and expensive. One drawback to requiring more complex circuitry is that the addition of components can often create RF interference among the other components and/or require redesign of the circuit layout. Similarly, the added electronics often increase the size and expense of the circuit and may require the use of a larger, more expensive microprocessor or controller. Typically, only a portion of the larger controller is used which increases waste and lowers the efficiency of the overall circuit. Another drawback to requiring more complex circuitry is that the transmitter often becomes harder for a user to program. For example, some universal transmitters require the user to perform a lengthy sequence of pressing and releasing the user inputs in order to enter the learn mode and/or program the transmitter. Therefore, designing a universal transmitter which can operate at multiple frequencies for multiple code formats, while making the programing of the transmitter less complicated is the aftermarket supplier's greatest challenge.

To date, several attempts have been made to provide universal transmitters. One example is U.S. Pat. No. 5,564,101 to Eisfeld et al. which discloses a universal transmitter for use with a garage door opener that allows for a user to program a transmitted modulation format and carrier frequency and transmit a signal corresponding to the selections. This transmitter uses two sets of mechanical DIP switches to select the transmitter code and carrier frequency. Such a configuration requires a larger controller having additional I/O ports, which will make the circuit more complex, increase the overall circuit size, raise costs, and result in making the transmitter more complicated to program.

U.S. Pat. No. 5,661,804 to Dykema et al. discloses a learning transmitter which can operate a plurality of different receivers employing rolling or encrypted code. No user input is required to learn the code and frequency, other than activating the transmitter to be copied. A single RF circuit, phase locked loop frequency synthesizer and dynamically tunable antenna are provided for learning and transmitting the desired code. Unfortunately, not all transmitters are functional when they are being replaced, so learning transmitters are not always available substitutes. In addition, transmitters which use single multi-frequency transmitter loops to generate signals at a variety of frequencies require additional time to manufacture-due to the increased time required to tune the transmitter loop appropriately-which increases the manufacturing costs and lowers the profitability of the transmitter for the manufacturer.

While all of these systems are capable of operating a plurality of receivers, each is complex, expensive, and difficult to program. Accordingly, there is a need for a simple, smaller, and less expensive transmitter capable of transmitting a plurality of different codes at a plurality of different modulations and frequencies. There is also a need for a new way of programing a universal transmitter that is less complicated and easier to perform.

SUMMARY OF THE INVENTION

A universal transmitter disclosed herein is capable of transmitting a plurality of signals at a plurality of different modulations and frequencies, and provides a simplified programming setup so that multiple signal configurations (including code format, modulation format and frequency) can be programed quickly and easily. The transmitter comprises a signal configuration input which an operator can use to select a desired signal configuration for transmission, a controller for interpreting the selected signal configuration, storing it to memory, retrieving it when the appropriate user input is depressed, and outputting it to a transmitter circuit capable of transmitting the selected signal configuration received from the controller at a predetermined modulation and frequency, and at least one user input for actuating the transmitter and identifying to the controller what signal configuration is to be transmitted by the transmitter.

The universal transmitter operator (or user) can store and transmit a plurality of signal configurations at a plurality of modulations and frequencies by simply placing the transmitter into a learn mode, adjusting the signal configuration input to a desired first signal configuration, selecting a user input with which the first signal configuration is to be associated so that the controller can retrieve and transmit the desired first signal configuration when operated, and storing the first signal configuration to memory so that the stored first signal configuration can be recalled and transmitted by the transmitter every time the user input associated with that signal is actuated. Once the transmitter is out of the learn mode and the user selects the user input associated with the stored first signal configuration, the controller will retrieve the stored first signal configuration from its memory location and transmit the signal specified by the stored first signal configuration settings at its appropriate code modulation and frequency.

A second signal configuration can be programmed by simply placing the transmitter back into learn mode, re-adjusting the signal configuration input to a desired second signal configuration, selecting a user input with which the second signal configuration is to be associated, and storing the second signal configuration to memory so that the stored second signal configuration can be recalled and transmitted by the transmitter every time the user input associated with that signal is actuated. Once the transmitter is out of the learn mode and the user selects the user input associated with the stored second signal configuration, the controller will retrieve the stored second signal configuration from its memory location and transmit the signal specified by the stored second signal configuration settings at its appropriate code modulation and frequency.

More particularly, the universal transmitter may include user inputs consisting of multi-position switches for identifying the signal configuration (e.g., the transmitter type, security code, code modulation, frequency, etc.), a controller for reading the multi-position switch settings, determining the selected signal configuration, storing the selected signal configuration into memory, and outputting the selected signal configuration with the appropriate code and at the appropriate modulation, a transmitter circuit for transmitting the signal configuration at the appropriate modulation and frequency, and a user input for actuating the transmitter and identifying to the controller what signal configuration is to be transmitted and at what modulation and frequency. The user input may be a DIP switch capable of identifying the transmitter type and security code format for the actuation signal. According to the preferred embodiment, two multi-position DIP switches may be used, with one being used for selecting what type of manufacturer's transmitter is to be emulated and another being used for selecting what type of security code is to be transmitted by the transmitter. The transmitter type selection indicates to the controller what type of code modulation and frequency the actuation signal is to be transmitted at, (e.g., is it suppose to operate as manufacturer A's transmitter at 300 MHZ, manufacturer B's transmitter at 310 MHZ, manufacturer C's transmitter at 390 MHZ, etc.). The security code switch indicates to the controller what logic sequence makes up the actuation signal, (e.g., what string of bits or bit sequence should be transmitted).

Once a user input has been actuated, the universal transmitter's controller will determine whether the transmitter has been placed into a learn mode or whether normal operation has been specified. When in the learn mode, the controller will determine which user input (e.g., pushbutton input) has been selected by the user and will store the signal configuration selected via the multi-position switch settings into a memory location associated with that particular user input. A user can store another signal configuration by simply placing the transmitter back into learn mode and re-adjusting the signal configuration input to the desired additional signal configuration. The controller will determine which user input has been depressed and will store the signal configuration selected via the multi-position switch settings into a memory location associated with that particular user input. This routine may be repeated until all the desired signal configurations have been programmed, until all the memory locations are full, or until all the user inputs have been assigned a desired signal configuration.

When in the normal operation mode, the controller will determine which user input has been actuated by the user and will retrieve the signal configuration stored at the memory location associated with the depressed input. The controller interprets the signal configuration retrieved from memory and outputs the stored code to transmitter circuitry capable of transmitting the signal specified by the stored signal configuration settings at the appropriate code modulation and frequency so that a receiver actuation signal will be generated. The transmitter circuitry may include a tunable transmitter loop capable of transmitting at a variety of frequencies, or may include separate transmitter loops each capable of generating signals at different frequencies. According to the preferred embodiment, separate transmitter loops are used and the controller interprets the signal configuration retrieved from memory and outputs the signal to the transmitter loop circuitry capable of transmitting the signal at the appropriate code modulation and frequency.

BRIEF DESCRIPTION OF THE DRAWINGS

Other objects and advantages of the invention will become apparent upon reading the following detailed description and upon reference to the drawings, in which:

FIG. 2 is a block diagram of a transmitter embodying the present invention;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
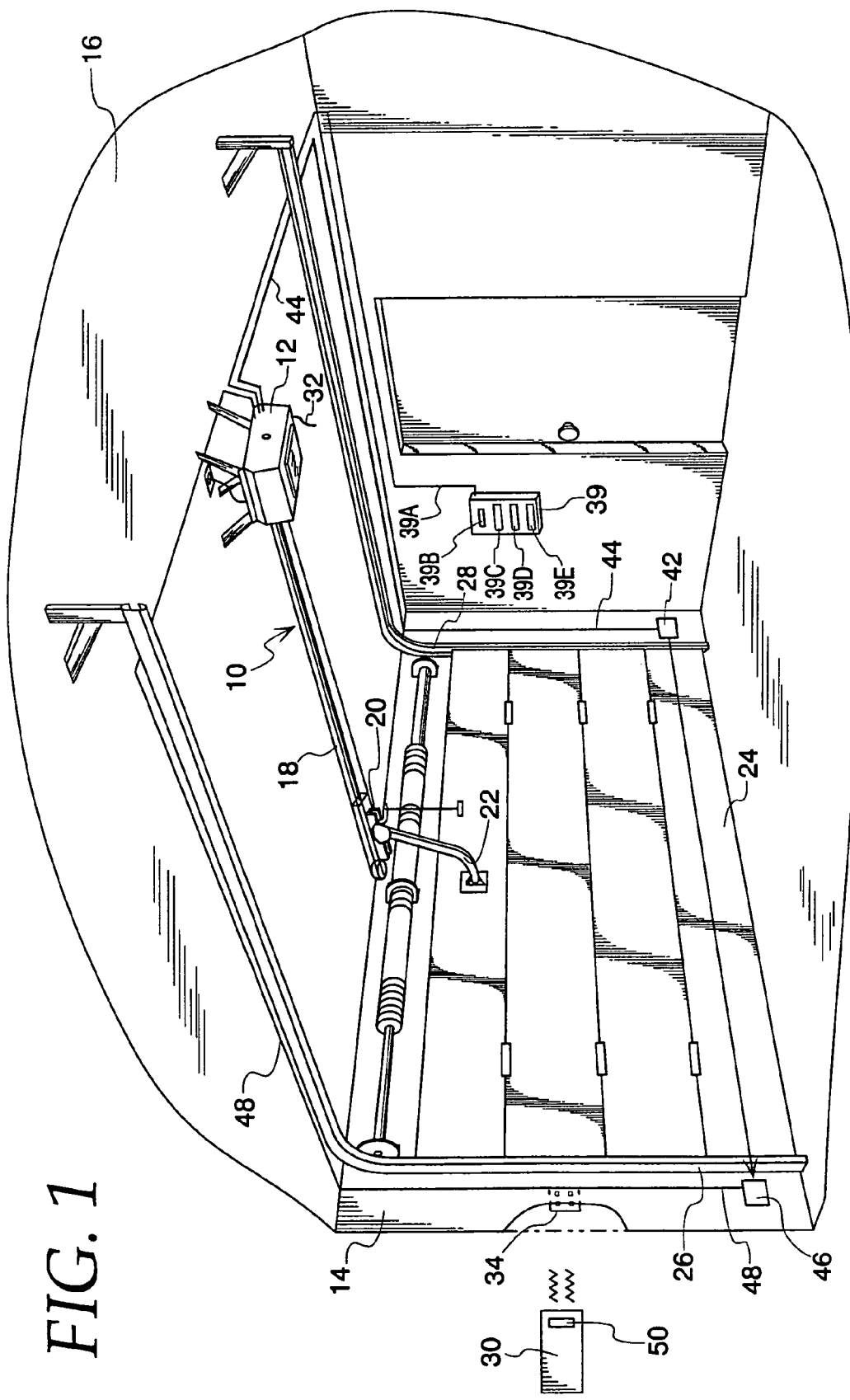
FIG. 1 is a perspective view of a movable barrier operator using a transmitter embodying the present invention.

Referring now to the drawings and especially to FIG. 1, in which a movable barrier operator embodying the present invention is generally shown therein and identified by reference numeral 10. The movable barrier operator 10 includes a head unit 12 mounted within a garage 14 and is employed for controlling the opening and closing of garage 14. More specifically, the head unit 12 is mounted to the ceiling 16 of the garage 14 and includes a rail 18 extending therefrom with a releasable trolley 20 attached having an arm 22 extending to a multiple paneled garage door 24 positioned for movement along a pair of door rails 26 and 28. The movable barrier operator 10 transfers the garage door 24 between the closed position illustrated in FIG. 1 and an open or raised position, allowing access to and from the garage 14.

The system includes a hand-held transmitter unit 30 adapted to send signals to an antenna 32 positioned on the head unit 12 and coupled to a receiver located within the head unit 12. An external control pad 34 is positioned on the outside of the garage having a plurality of buttons thereon and communicates via radio frequency transmission with the antenna 32 of the head unit 12. The transmitter 30 and control pad 34 are capable of being programmed to transmit a plurality of different codes at a plurality of different frequencies, as will be appreciated in more detail hereinafter. A switch module 39 is mounted on a wall of the garage. The switch module 39 is connected to the head unit by a pair of wires 39a. The switch module 39 includes a learn switch 39b, a light switch 39c, a lock switch 39d and a command switch 39e.

An optical emitter 42 and an optical detector 46 are coupled to the head unit 12 by a pair of wires 44 and 48, respectively. The emitter 42 and detector 46 are used to satisfy the requirements of Underwriter's Laboratories, the Consumer Product Safety Commission and the like which require that garage door operators sold in the United States must, when in a closing mode and contacting an obstruction having a height of more than one inch, reverse and open the door in order to prevent damage to property and injury to persons. A conventional pass point detector or absolute positioning detector may also be used to indicate door position to the controller.

The transmitter 30 includes a plurality of user inputs 50, a signal configuration input 52, controller 54, memory 56, and transmitter circuitry 58, as shown in FIG. 2. The user inputs 50 can comprise any number of pushbuttons and operate to send power to the controller 54, (indicating that a receiver actuation signal should be transmitted or that learn mode should be entered). The signal configuration input 52 comprises a plurality of multi-position switches that allow the user to select a signal configuration from a plurality of possible transmitter types, bit patterns, code modulation schemes, and frequencies. The signal configuration input settings determine what type of signal will be transmitted as part of the receiver actuation signal.

As will be discussed in more detail below, the controller 54 determines which user input 50 has been pressed and whether the transmitter has been placed into a learn mode. If in the learn mode, the controller 54 reads the signal configuration input 52 settings and stores the signal configuration settings in memory 56 in a location associated with the particular pushbutton pressed. The transmitter 30 can be programmed with additional signal configurations in similar fashion. Specifically, the user adjusts the configuration input 52 to the desired additional signal configuration, places the transmitter 30 into learn mode, and selects another user input 50 with which the additional signal configuration is to be associated. The controller 54 reads the configuration input 52 settings and stores the signal configuration settings in memory 56. This process is repeated until all the desired signal configurations have been stored, until all the available memory is used up, or until all user inputs 50 have been assigned a desired signal configuration.

If the controller 54 determines that the transmitter 30 is not in the learn mode, it retrieves the signal configuration stored at the memory location 56 associated with the depressed input 50. The controller 54 interprets the signal configuration retrieved from memory and outputs the stored code at the appropriate modulation to transmitter circuitry 58 which is capable of transmitting the signal specified by the stored signal configuration settings at the appropriate code modulation and frequency so that a receiver actuation signal will be generated. The transmitter circuitry 58 may include a tunable transmitter loop capable of transmitting at a variety of frequencies, or may include separate transmitter loops each capable of generating signals, at different frequencies. For example, in FIG. 2, the controller 54 would output data to transmitter circuitry 58 and tune the transmitter circuitry 58 to output at 310 Megahertz (MHZ) if the configuration input 52 specified transmitting an eight bit or ten bit receiver actuation signal at 310 MHZ. Similarly, the controller would tune the transmitter circuitry 58 to output at 300 MHZ if the configuration input 52 specified transmitting a ten bit receiver actuation signal at 300 MHZ. The controller 54 may also tune the transmitter circuitry to 390 MHZ if the configuration input 52 specified transmitting packets of nine bit, twelve bit, or twenty bit packets at 390 MHZ. As discussed further below, the transmitter circuitry 58 may include several transmitter loops each being capable of generating a receiver actuation signal at a different frequency, (e.g., one loop for 300 MHZ, one for 310 MHZ, one for 390 MHZ, etc.).

Figure 3A:
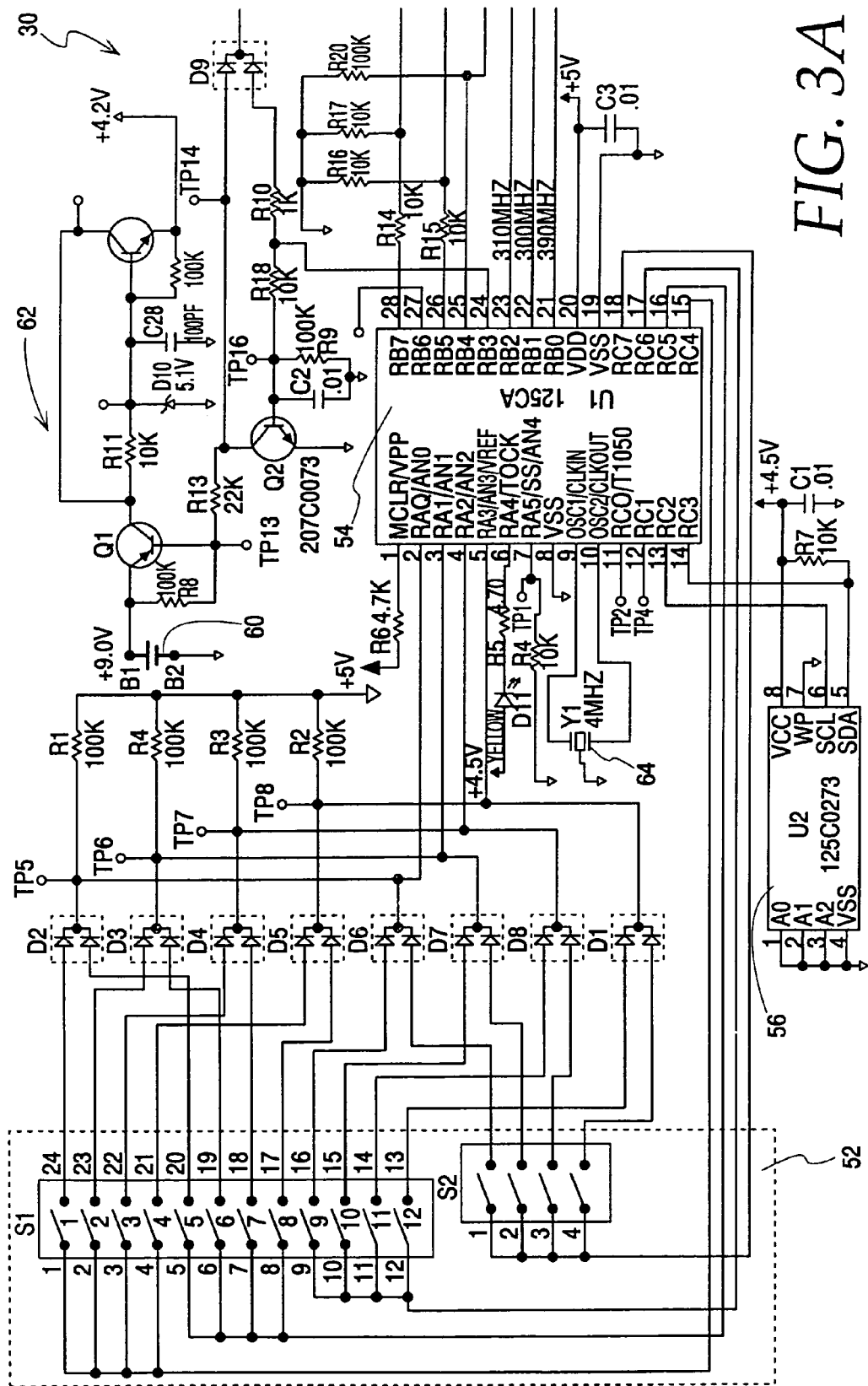
FIGS. 3A-3B show a schematic incorporating the transmitter shown in FIG. 2.
Figure 3B:
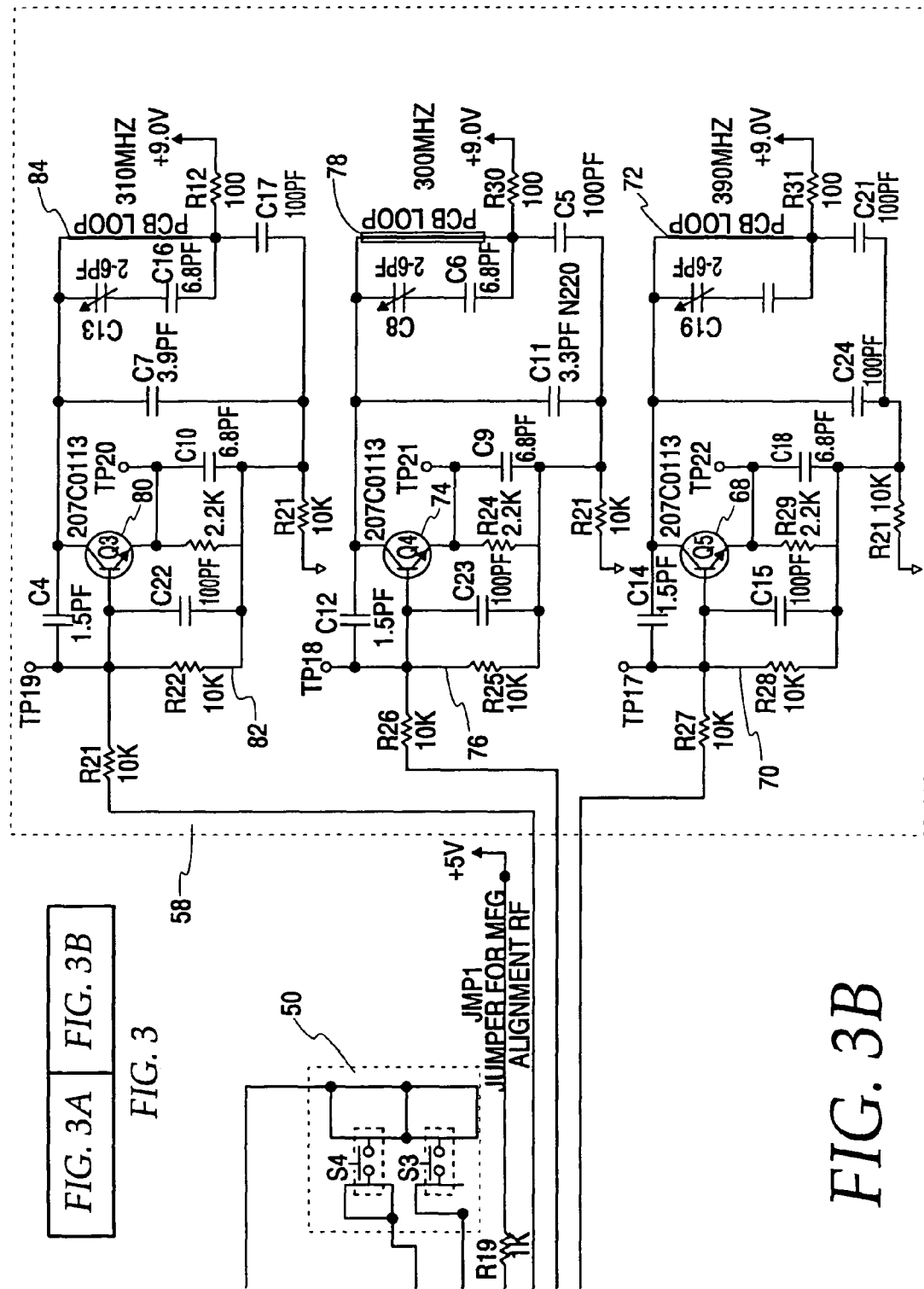

Turning now to FIGS. 3A-3B, in which a schematic diagram of a transmitter embodying the present invention is shown generally at reference number 30. As discussed above, the transmitter 30 includes user input 50, signal configuration input (or configuration input) 52, controller 54, memory 56 and transmitter circuitry 58. Power is supplied to the transmitter 30 via battery 60 and power circuitry 62 which regulates the voltage supply to +5 Volts (V) for pins VPP, VSS and VDD of controller 54 (which may be a Microchip PIC16C63A). A 4 MHz crystal clock generator (oscillator) 64, such as a ceramic resonator, is coupled to pins CLKIN and CLKOUT to provide timing for the controller 54. The configuration input 52 includes two multi-position DIP switches S1 and S2 which are connected to input pins RA0, RA1, RA2 and RA3 of controller 54 on one side and pins RC4, RC5, RC6 and RC7 on the other. Switches S1 and S2 provide sixteen switches with which the user is able to identify the signal configuration. The controller 54 reads the multi-position switch settings by cycling pin RC7, RC6, RC5 and RC4 on one at a time. From the controller's perspective the switches are arranged in a four by four matrix with pins RA0, RA1, RA2 and RA3 making up the rows and pins RC4, RC5, RC6 and RC7 making up the columns.

Switch S1 contains four switches which are used to identify the type of transmitter that is to be emulated by the universal transmitter 30. The switches of S1 are adjusted to open or close the contacts of the DIP switch and are all connected to output pin RC7 of the controller 54. The controller 54 determines the position of each of the four switches in DIP switch S1 by driving output pin RC7 high and reading the input received on input pins RA0, RA1, RA2 and RA3. For each of the four switches in DIP switch S1 that are closed, a high input will be received on the input pin coupled to the closed switch. The settings of these switches will identify to the controller 54 which transmitter is to be emulated. In the preferred embodiment, the universal transmitter is set up to emulate eight different transmitters. These may be transmitters from Stanley, MultiCode, Linear/Moore-O-Matic, Genie and Chamberlain.

Switch S2 contains twelve switches which are used to identify the security code (or bit sequence) that is to be transmitted by the universal transmitter 30. In order to read the settings of switch S2, the twelve switches of S2 are separated into three groups with four switches in each group. The three groups of switches are connected to output pins RC6, RC5 and RC4. The controller 54 determines the position of each of the four switches in the first group of switches by driving output pin RC6 high and reading the input received on input pins RA0, RA1, RA2 and RA3. For each closed switch a high input will be received on the input pin coupled to the closed switch. The settings of these switches will identify to the controller 54 the first four digits of code that are to be transmitted by the transmitter 30. Then the controller 54 determines the position of each of the four switches in the second group of switches by driving output pin RC5 high and reading the input received on input pins RA0, RA1, RA2 and RA3. Again, for each closed switch a high input will be received on the input pin coupled to the closed switch. The settings of these switches will identify to the controller 54 the fifth through eighth digits of code that are to be transmitted by the transmitter 30. Lastly, the controller 54 determines the position of each of the four switches in the third group of switches by driving output pin RC4 high and reading the input received on input pins RA0, RA1, RA2 and RA3. A high input will be received on the input pins coupled to closed switches. The settings of these switches will identify to the controller 54 the remaining digits of code that are to be transmitted by the transmitter 30.

In order to have the controller read the configuration input switch settings, the transmitter 30 must be placed in a learn mode. The transmitter 30 is placed in learn mode by depressing the user input switches 50 (e.g., momentary switches S3 and S4) down together and holding them down for a minimum of five seconds although other arrangements for entering the learn mode, such as dedicated learn mode switches could be used. When the controller 54 has entered the learn mode, it will alternate pin RA4 high and low causing bursts of current to flow through the current limiting resistor R5 and through the yellow light emitting diode (LED) 66 making the LED 66 blink. The controller 54 will remain in learn mode for 10 seconds and will store the signal configuration settings into memory 56 once a user input 50 is depressed. Since the momentary switches S3 and S4 of the transmitter 30 are coupled to the battery 60 on one side and to pins RB5 and RB7 on the other, the controller 54 is capable of determining when a user input 50 has been depressed by polling pins RB5 and RB7 to see if either have been driven high. If either pin has been driven high, the controller 54 knows that the switch (S3 or S4) connected to the pin driven high (RB5 or RB7) has been closed. The memory location where the signal configuration settings are stored is associated with the user input that was depressed so that the controller 54 will recall the correct signal configuration every time that input is depressed. Memory 56 may consist of a serial EEPROM such as PIC16CR62.

A second signal configuration may be programmed into the transmitter 30 by placing the transmitter 30 back into learn mode, (e.g., depressing both user inputs 50 at the same time and holding for a minimum of five seconds), and selecting/depressing a user input 50 with which the new signal configuration is to be associated. Since the transmitter 30 only remains in the learn mode for ten seconds, the signal configuration settings should be made prior to placing the transmitter 30 into learn mode. By doing so, the user will only need to select the user input 50 the signal configuration settings are to be associated with while the transmitter 30 is in learn mode. In FIG. 3, a two button transmitter is provided in which one signal configuration setting can be stored for switch S3 of user input 50 and another signal configuration setting can be stored for switch S4 of user input 50. In other embodiments, additional user input switches may be provided to allow for the storing of additional signal configurations, (e.g., a three button transmitter may be provided to allow for a third signal configuration setting to be stored, a fourth button transmitter may be provided to allow for a fourth signal configuration setting to be stored, etc.).

A stored signal configuration setting may be replaced by another signal configuration setting by simply adjusting the signal configuration input 52 to the desired new signal configuration setting, placing the transmitter 30 into learn mode, and selecting the user input 50 associated with the old signal configuration setting to be replaced. This action will cause the controller 54 to store the new signal configuration settings (or the current settings of the multi-position switches S1 and S2) in place of the old signal configuration settings.

Unless the learn mode is again entered, the multi-position switch settings may be altered in any fashion without affecting how the transmitter 30 works. This is due to the fact that the signal configuration settings needed for transmitting by the transmitter 30 are retrieved from memory 56 not directly from the configuration input 52. The signal configuration input 52 simply serves as a way of getting these signal configuration settings stored into memory 56.

During normal operation (e.g., when the transmitter 30 is not in learn mode) the controller 54 keeps the transmitter 30 in a suppressed state called sleep mode in an effort to preserve battery power and prolong battery life. The controller 54 is awakened from sleep mode when either of the input pins RB5 and RB7 are driven high, or when both of the input pins RB5 and RB7 are driven high. In the former instance, the driving of one of the input pins RB5 and RB7 signifies to the controller that the user input 50 has been depressed. In the latter instance, the driving of both input pins RB5 and RB7 signifies to the controller 54 that the learn mode should be entered (presuming both inputs are depressed for a minimum of five seconds). If one of the user inputs 50 are depressed, the controller retrieves the signal configuration settings from the memory location associated with the depressed user input (S3 or S4) and determines what transmitter circuitry 58 the signal should be outputted to for transmission.

In response to the detection of a depressed user input 50 associated with a code to be transmitted at 390 MHZ, the controller 54 will bias transistor 68 on via pin RB0 to modulate oscillator circuit 70 and transmit the signal specified by the stored signal configuration settings (or stored signal). Transistor 68 and oscillator circuit 70 enable the RF transmission of the stored signal at approximately 390 MHZ via the antenna 72, herein a printed circuit board (PCB) loop antenna. When the selected signal configuration settings indicate that the stored signal is to be transmitted at 300 MHZ, the controller 54 will bias transistor 74 on via pin RB1 to modulate oscillator circuit 76 and transmit the stored signal. Transistor 74 and oscillator circuit 76 enable the RF transmission of the stored signal at approximately 300 MHZ via the antenna 78. When the selected signal configuration settings indicate that the stored signal is to be transmitted at 310 MHZ the controller 54 will bias transistor 80 on via pin RB2 to modulate oscillator circuit 82 and transmit the stored signal. As with the other transmitter circuits, transistor 80 and oscillator circuit 82 enable the RF transmission of the stored signal at approximately 310 MHZ via the antenna 84. When an input 50 has been depressed and the transmitter is transmitting the stored signal, the controller 54 will set pin RA4 high causing current to flow through the current limiting capacitor R5 and through the yellow light emitting diode (LED) 66 causing the diode to remain steadily lit thereby indicated to the user that the transmission request has been received and that the transmitter is operating.

Figure 4A:
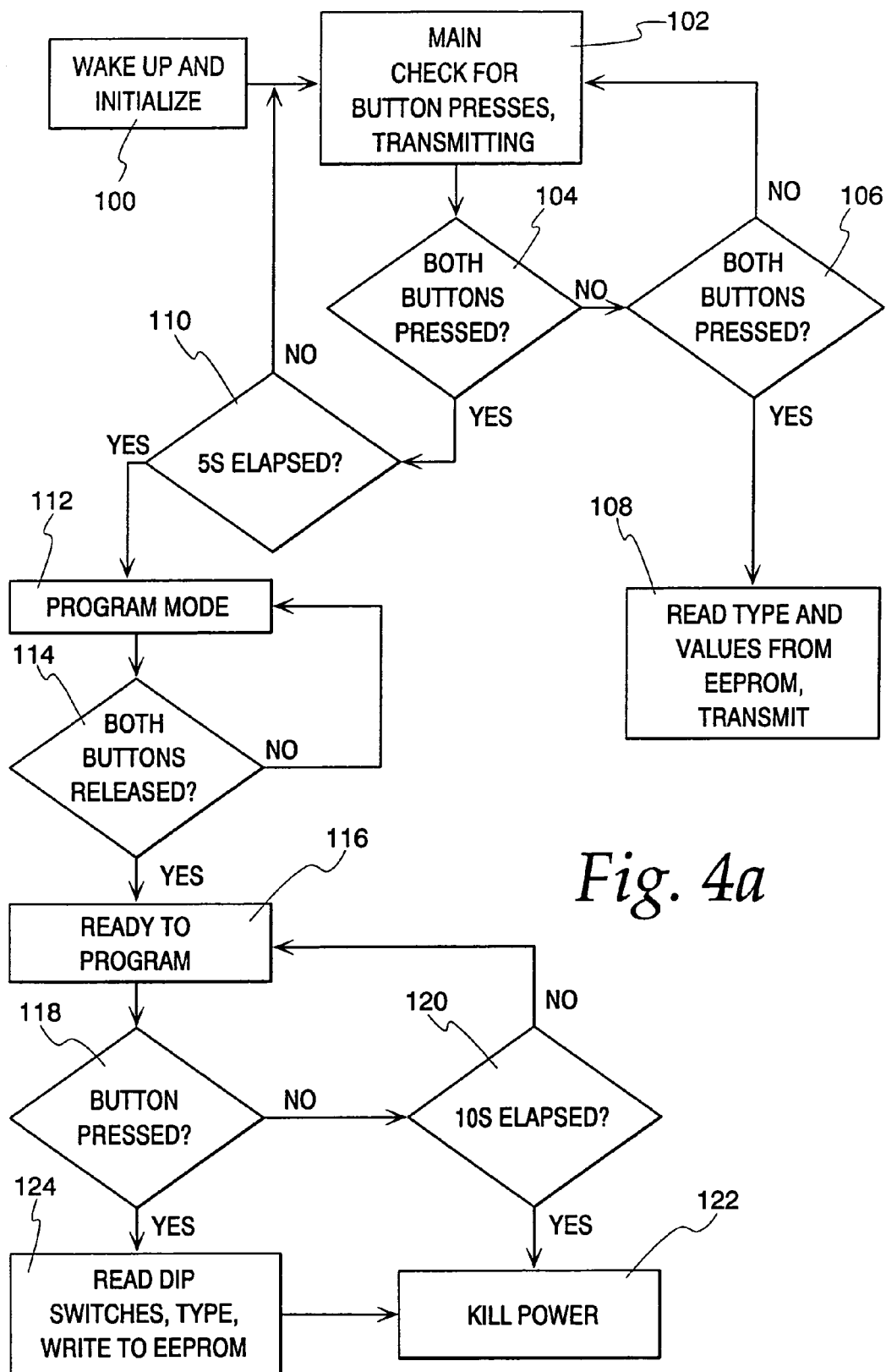
FIGS. 4a-b are upper level flow charts of the instructions executing in the controller of FIG. 3.

Turning now to FIG. 4a, in which upper-level flow charts of the instructions executing in the controller 54 are shown. During normal operation, the transmitter 30 is awakened out of sleep mode and initialized in step 100 in response to a user input 50 being depressed. The controller 54 then checks to see if user input buttons S3 and S4 have been pressed in step 102, and specifically, whether both input buttons S3 and S4 have been pressed in step 104. If both buttons are not being pressed, the controller 54 checks in step 106 to see if one button has been pressed. If not, the controller returns to its main function of checking to see if any input buttons 50 have been pressed in step 102. If one input button S3 or S4 has been pressed, the controller reads (or retrieves) the stored signal configuration settings from EEPROM 56, starts interrupt Timer 2 (FIG. 4b), and transmits the desired signal via the transmitter circuitry 58 in step 108.

If both input buttons S3 and S4 have been depressed (or pressed), the controller checks in step 110 to determine whether five seconds has elapsed. If not, the controller returns to its main function of checking in step 102 to determine whether any inputs 50 have been pressed. If five seconds has elapsed, the controller 54 places the transmitter in program (or learn) mode in step 112 and checks to see if both buttons S3 and S4 have been released in step 114. If both buttons continue to be pressed, the controller 54 loops back to step 112 and 114 until both buttons have been released. Once both buttons have been released, the controller 54 in step 116 is ready to program and checks in step 118 to see if one of the input buttons 50 have been pressed. If not, the controller 54 checks to see whether ten seconds have elapsed in step 120. If ten seconds have not elapsed, the controller remains ready to program in step 116 and checks for button presses in step 118. If ten seconds have elapsed, the controller 54 places the transmitter 30 into sleep mode in step 122. If the controller detects that a button has been depressed prior to ten seconds elapsing, it will read the signal configuration settings of the signal configuration input 52 to determine the signal configuration (e.g., code, format and frequency) and store the same in step 124 to EEPROM 56 at a memory location associated with the pressed push button or user input 50.

Figure 4B:
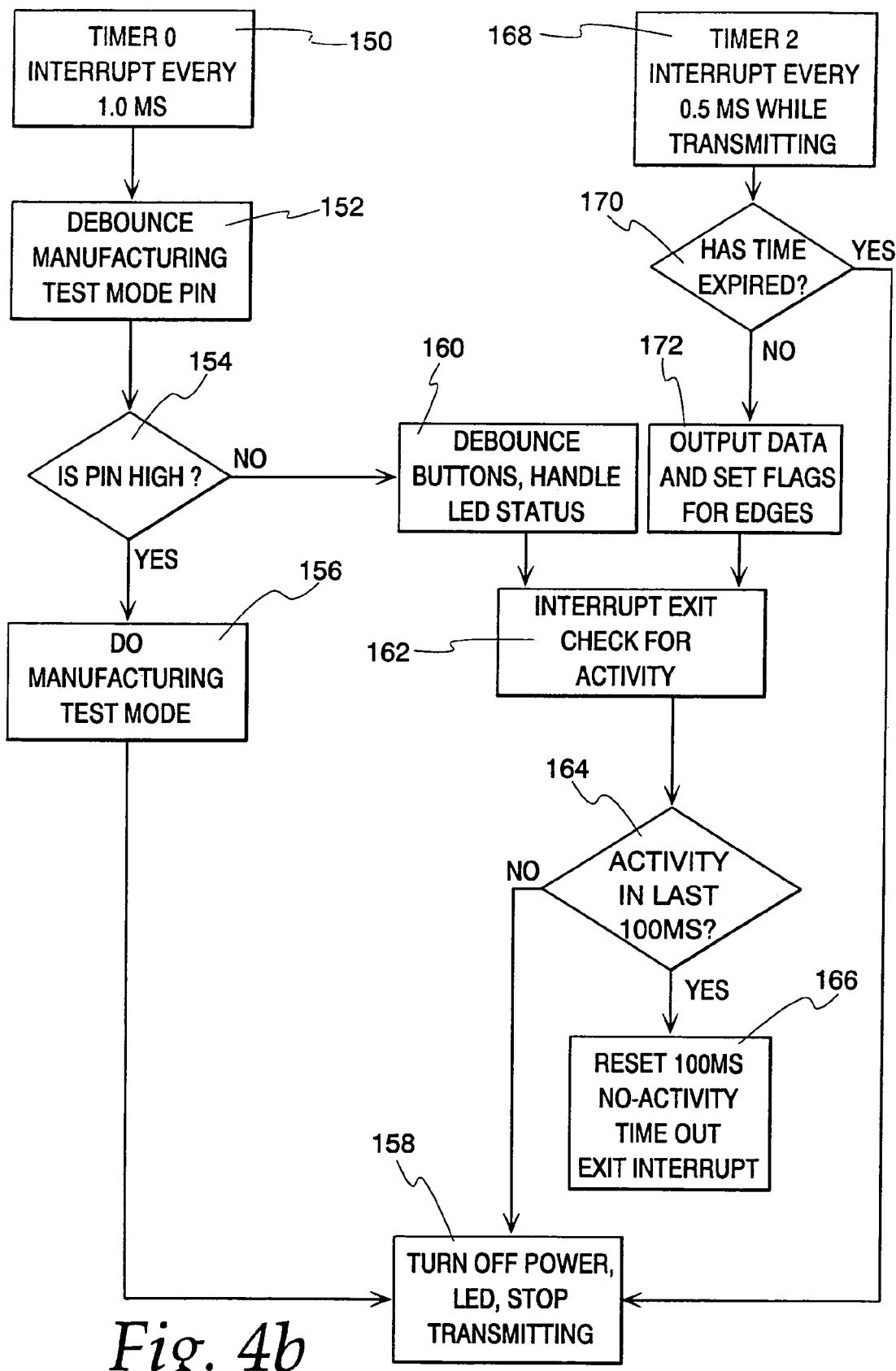

In FIG. 4b, the main interrupt Timer 0 interrupt, causes an interrupt to occur every one millisecond (mS) in step 150. At this time, the controller 54 debounces the manufacturing test mode pin of the controller 54 in step 152 and then checks to see if the test mode pin is high in step 154. If the manufacturing test mode pin is high, the controller is placed into a manufacturing test mode in step 156. During the manufacturing test mode each of the transmit frequencies are turned on for twelve mS. In the schematic of FIG. 3, pin RB4 of controller 54 is the manufacturing test mode pin. Once the test mode is complete, pin RB4 goes low and the controller stops the transmitter from transmitting in step 158 and shuts down the transmitter power (e.g., makes the transmitter enter sleep mode). If the manufacturing test mode pin is not high, the controller 54 debounces the input buttons 50 in step 160 and checks for activity with respect to the transmitter 30 in step 162. During this check, the controller 54 determines whether the transmitter is still transmitting a signal. With less secure transmissions, the entire signal can be sent in one cycle or frame; however, in more complex transmissions the signal may require two frames of data to be sent. If there has not been activity within the last one hundred mS, control is shifted from step 164 to step 158 and the controller 54 places the transmitter in sleep mode. If there has been activity in the past one hundred mS, control is shifted from step 164 to step 166 and the no-activity timeout timer is reset to one hundred mS and the Timer 0 interrupt is exited (e.g., returning the controller to the state it was in prior to the interrupt).

The Timer 2 interrupt begins at step 168 when the transmitter 30 has started transmitting and interrupts every one-half mS. During this interrupt, the controller 54 checks to see if a one hundred forty-four second timeout has expired in step 170. If the timeout has expired, the controller 54 the controller 54 assumes one of the user inputs 50 is stuck on, stops the transmitter 30 from transmitting, and places the transmitter 30 in sleep mode in step 158. If the transmit timer has not expired, the controller 54 continues to output the data stored in the memory location corresponding to the selected input button 50 and sets flags for the edges of the transmitted signal in step 172. Once the transmitter has completed transmitting the Timer 2 interrupt is exited and the controller checks to see if there has been any activity with respect to the transmitter buttons in step 162. Specifically, the controller 54 checks to see if there has been any activity within the last one hundred mS in step 164. If there has not been any activity, the transmitter is placed in sleep mode in step 158. If there has been activity within the last one hundred mS, the no-activity timeout timer is reset to one hundred mS and the Timer 0 interrupt is exited at step 166. As referenced above, a computer program listing appendix including code executed by controller 54 has been submitted with the filing of this application.

Thus it is apparent that there has been provided, in accordance with the invention, a universal transmitter that fully satisfies the objects, aims, and advantages set forth above.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A transmitter for transmitting security codes at a plurality of modulations and frequencies comprising:
   a plurality user manipulatable signal configuration switches which are adjusted by an operator to define signal configuration settings for transmitter signals, the signal configuration settings comprising at least a code to be transmitted by the transmitter;
   a plurality of user manipulatable transmit initiation keys;
   a controller responsive to the signal configuration switches during a learn mode for storing the signal configurations defined by the signal configuration switches in a memory location in association with selected ones of the user manipulatable transmit initiation keys;
   apparatus responsive to user interaction with each transmit initiation key during an operate mode for retrieving the signal configuration stored in association therewith; and
   transmitter circuitry for transmitting the retrieved signal configuration received from the controller at a predetermined frequency.

2. A transmitter according to claim 1, wherein the signal configuration switches comprise:
   a multi-position switch for defining a type of transmitter that is to be emulated; and
   a multi-position switch for defining a code to be transmitted by the transmitter.

3. A transmitter according to claim 1, wherein the transmit initiation keys comprise:
   a first switch identifying to the controller the location of a first signal configuration to be retrieved and transmitted; an
   a second switch identifying to the controller the location of a second signal configuration to be retrieved and transmitted.

4. A transmitter according to claim 1, wherein the transmitter circuitry comprises:
   a single transmitter circuit for selectively transmitting a signal at one of a plurality of different frequencies.

5. A transmitter according to claim 4, wherein the single transmitter circuit further comprises a transmitter circuit selectively operable at frequencies of 300 MHZ, 310 MHZ and 390 MHZ.

6. A transmitter according to claim 1, wherein the transmitter circuitry comprises:
   a first transmitter circuit for transmitting at a first predetermined frequency; and
   a second transmitter circuit for transmitting at a second predetermined frequency.

7. A method of programming a universal transmitter comprising a plurality of user manipulatable signal configuration switches, the method comprising:
   setting the plurality of signal configuration switches to a first set of positions defining a first signal configuration including a first code to be transmitted by the transmitter;
   storing the first signal configuration defined by the signal configuration switches into a first memory location;
   setting the plurality of signal configuration switches to a second set of positions defining a second signal configuration including a second code to be transmitted by the transmitter;
   storing the second signal configuration defined by the signal configuration switches into a second memory location;
   associating one of a plurality of transmit switches with each stored signal configuration; and
   detecting user interaction with one of the plurality of transmit switches and transmitting the stored signal configuration associated therewith.

8. A method of programming a transmitter comprising:
   setting a signal configuration switch to a first set of positions defining a first signal configuration including a first code to be transmitted by the transmitter;
   selecting one of a plurality of transmit switches with which the first signal configuration is to be associated;
   storing the first signal configuration into a first memory location;
   setting the signal configuration switch input to a second set of positions defining a second signal configuration including a second code to be transmitted by the transmitter;
   selecting one of the plurality of transmit switches with which the second signal configuration is to be associated; and
   storing the second selected signal configuration into a second memory location.

9. A method of programming a transmitter including a plurality of multi-position signal configuration switches comprising:
   setting the multi-position switches to a first set of positions defining a first signal configuration including a first code to be transmitted by the transmitter;
   selecting one of a plurality of transmit switches during a first learn mode operation with which the first signal configuration is to be associated;
   storing the first signal configuration into a first memory location;
   setting the multi-position switches to a second set of positions defining to a second signal configuration including a second code to be transmitted by the transmitter;
   selecting one of a plurality of transmit switches during a second learn mode operation with which the second signal configuration is to be associated; and
   storing the second signal configuration into a second memory location.

10. A method according to claim 9, comprising:
    depressing a predetermined transmit switch for a predetermined period of time in order to place the transmitter into a learn mode.

11. A method according to claim 9, comprising:
    identifying from the multi-position switch settings a type of transmitter to be emulated.

12. A method according to claim 9, comprising:
    identifying from the multi-position switch settings a security code to be transmitted.

13. A method according to claim 9, comprising:
    identifying from the multi-position switch settings a modulation format at which a signal is to be transmitted.

14. A method according to claim 9, comprising:
    identifying from the multi-position settings a frequency at which a signal is to be transmitted.

15. A method of operating a code learning apparatus having a plurality of signal configuration switches, comprising steps of:

setting a combination of the configuration switches to define a code signal configuration including a code signal to be learned by the code learning apparatus;

activating a learn mode of the code learning apparatus;

reading the identified code signal configuration from the configuration switches during the learn mode; and storing the code signal configuration read from the configuration switches in a predetermined memory location.

16. A method in accordance with claim 15, wherein the combination of the configuration switch settings comprises a security code.

17. A method in accordance with claim 15, wherein the code signal configuration identifies a security code and a code format in which the signal is to be transmitted.

18. A method in accordance with claim 15, wherein a code learning apparatus comprises a plurality of transmit switches, the method further comprising steps of:

identifying one of the transmit switches; and storing a code signal configuration in a memory location associated with the identified transmit switch.

19. A method in accordance with claim 18, wherein the learning apparatus comprises at least one transmitter, and the method comprises:

identifying one of the transmit switches during a transmit mode;

reading from the memory, the code signal configuration associated with the identified transmit switch; and transmitting a signal in accordance with the code signal configuration read from the memory.

20. A method in accordance with claim 19, wherein the at least one transmitter is an RF transmitter, and the code signal configuration includes a type of transmitter, an RF frequency and a modulation format in which a signal is to be transmitted.

* * * * *

UNITED STATES PATENT AND TRADEMARK OFFICE
CERTIFICATE OF CORRECTION

PATENT NO. : 8,325,008 B2
APPLICATION NO. : 09/842346
DATED : December 4, 2012
INVENTOR(S) : Robert Roy Keller, Jr., Joseph John Cacciatore and Mark A. McCarthy, Jr.

Page 1 of 1

It is certified that error appears in the above-identified patent and that said Letters Patent is hereby corrected as shown below:

IN THE CLAIMS:

Claim 3, Column 11, Line 41: Change "an" to -- and --.

Signed and Sealed this
Fourteenth Day of May, 2013

Teresa Stanek Rea
*Acting Director of the United States Patent and Trademark Office*